United States Patent
Sano et al.

(10) Patent No.: US 8,991,367 B2
(45) Date of Patent: Mar. 31, 2015

(54) EGR RATE DETERMINATION METHOD AND CONTROL DEVICE FOR INTERNAL COMBUSTION ENGINE

(75) Inventors: Takeshi Sano, Gotenba (JP); Hiromichi Yasuda, Gotenba (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 58 days.

(21) Appl. No.: 13/521,668

(22) PCT Filed: Mar. 23, 2010

(86) PCT No.: PCT/JP2010/054993
§ 371 (c)(1),
(2), (4) Date: Jul. 11, 2012

(87) PCT Pub. No.: WO2011/117973
PCT Pub. Date: Sep. 29, 2011

(65) Prior Publication Data
US 2013/0133632 A1 May 30, 2013

(51) Int. Cl.
*F02B 47/08* (2006.01)
*F02M 25/07* (2006.01)
(Continued)

(52) U.S. Cl.
CPC ......... *F02M 25/0753* (2013.01); *F02D 35/023* (2013.01); *F02D 41/0072* (2013.01); *F02D 21/08* (2013.01); *F02D 2200/101* (2013.01);
(Continued)

(58) Field of Classification Search
CPC .................. F02D 41/0062; F02D 41/0072
USPC ............ 73/35.12, 114.16, 114.18, 114.74; 701/108; 123/568.11, 435; 60/605.2
See application file for complete search history.

(56) References Cited

U.S. PATENT DOCUMENTS 5,617,833 A * 4/1997 Tomisawa et al. ....... 123/568.16
5,758,309 A 5/1998 Satoh
(Continued)

FOREIGN PATENT DOCUMENTS

JP 5-263718 A 10/1993
JP 8-177644 A 7/1996
(Continued)

OTHER PUBLICATIONS

Per Tunestal, "Estimation of the In-Cyclind Air/Fuel Ratio of an Internal Combustion Engine by the Use of Pressure Sensor", 2001, Lund Institute of Technology.*

(Continued)

*Primary Examiner* — Lindsay Low
*Assistant Examiner* — Robert Werner
(74) *Attorney, Agent, or Firm* — Sughrue Mion, PLLC (57) ABSTRACT

The present invention makes it possible to accurately determine an EGR rate from an in-cylinder pressure. An EGR rate determination method for an internal combustion engine according to the present invention, a combustion period is calculated by using in-cylinder pressure data measured by an in-cylinder pressure sensor. An in-cylinder flame velocity is then calculated from the combustion period. Next, in accordance with prepared data indicative of the influence of an engine speed on the flame velocity, a portion of the flame velocity calculated from the combustion period that is affected by the engine speed is eliminated. Eventually, a current EGR rate is determined from the flame velocity from which the portion affected by the engine speed is eliminated.

8 Claims, 4 Drawing Sheets

(51) Int. Cl.
*F02D 35/02* (2006.01)
*F02D 41/00* (2006.01)
*F02D 21/08* (2006.01)

(52) U.S. Cl.
CPC ............ *F02M 25/0754* (2013.01); *F02D 35/02* (2013.01); *Y02T 10/47* (2013.01); *F02D 2021/083* (2013.01)
USPC ................................. 123/568.11; 123/568.21

(56) References Cited

U.S. PATENT DOCUMENTS

| | | | |
|---|---|---|---|
| 6,076,502 A * | 6/2000 | Katashiba et al. | 123/435 |
| 7,231,906 B1 * | 6/2007 | Haskara et al. | 123/435 |
| 7,360,523 B2 * | 4/2008 | Sloane et al. | 123/305 |
| 7,661,408 B2 * | 2/2010 | Kassner | 123/435 |
| 8,844,499 B2 * | 9/2014 | Porten et al. | 123/406.48 |

FOREIGN PATENT DOCUMENTS

| | | |
|---|---|---|
| JP | 9-151806 A | 6/1997 |
| JP | 3158339 B2 | 4/2001 |
| JP | 2006-336661 A | 12/2006 |
| JP | 2007-032530 A | 2/2007 |

OTHER PUBLICATIONS

Mattias Bruce, "Estimation fo the EGR rate in a GDI engine working in stratified mode using the ionization current", Dec. 12, 2000, Linkopings Universitet.*

* cited by examiner

EGR RATE DETERMINATION METHOD AND CONTROL DEVICE FOR INTERNAL COMBUSTION ENGINE

CROSS REFERENCE TO RELATED APPLICATION

This application is a National Stage of International Application No. PCT/JP2010/054993 filed Mar. 23, 2010, the contents of all of which are incorporated herein by reference in their entirety.

TECHNICAL FIELD

The present invention relates to a method of determining an EGR rate from an in-cylinder pressure in an internal combustion engine. The present invention also relates to a control device for controlling an operation of the internal combustion engine in accordance with the EGR rate determined from the in-cylinder pressure and to a control device for controlling the EGR rate in accordance with the EGR rate determined from the in-cylinder pressure.

BACKGROUND ART

Exhaust gas recirculation (EGR), which recirculates a portion of exhaust gas back to an intake side, is widely used for an automotive internal combustion engine. Performing EGR makes it possible not only to reduce NOx in the exhaust gas, but also to provide improved fuel efficiency.

The above effects produced by EGR can be enhanced by introducing an increased amount of EGR gas into a cylinder, that is, by increasing an in-cylinder EGR rate. Meanwhile, increasing the in-cylinder EGR rate is likely to cause the EGR rate to vary from one cylinder to another and degrade the quality of combustion. To avoid such a situation, it is necessary, before anything else, to accurately determine the in-cylinder EGR rate. Thereafter, exercising proper engine control in accordance with the EGR rate or accurately controlling the EGR rate are required.

However, the in-cylinder EGR rate cannot be directly measured. There is no alternative but to indirectly determine the in-cylinder EGR rate in accordance with certain information. A heat release rate and a combustion period have been conventionally used as such information. It is known that the in-cylinder EGR rate is closely related to the heat release rate and combustion period. Although the heat release rate and combustion period cannot be directly measured, they can be accurately calculated from measured data about the in-cylinder pressure as far as the employed internal combustion engine has an in-cylinder pressure sensor.

Inventions disclosed in JP-A-1997-151806, Japanese Patent No. 3158339, and JP-A-2006-336661 relate to EGR and focus attention on the heat release rate and combustion period. The invention disclosed in JP-A-1997-151806 calculates a decrease in an EGR amount in accordance with a heat release rate difference between an EGR-on state and an EGR-off state. The invention disclosed in Japanese Patent No. 3158339 calculates the decrease in the EGR amount in accordance with a combustion period difference between the EGR-on state and the EGR-off state. The invention disclosed in JP-A-2006-336661 calculates a combustion pressure characteristic value for the combustion period from the in-cylinder pressure and provides feedback control of the opening of an EGR valve so as to optimize the combustion pressure characteristic value.

However, the method of calculating the EGR rate from the heat release rate and combustion period has turned out to be impractical from the viewpoint of accuracy. The reason is that the relationship between the in-cylinder EGR rate, the heat release rate, and the combustion period significantly varies with the operating status of the internal combustion engine. To accurately determine the EGR rate from the heat release rate and combustion period, it is necessary to prepare a relevant relational map for each operating state. It means that an enormous amount of map data needs to be prepared. Thus, the adaptation of maps entails heavy workload. In addition, a large memory is required for implementing the maps in a control device.

SUMMARY OF THE INVENTION

As described above, determining the in-cylinder EGR rate with high accuracy by a practical method can be defined as an important task for providing improved emissions performance and fuel efficiency by making use of EGR.

Under the above circumstances, the inventors of the present invention have newly focused attention on an in-cylinder flame velocity as an index indicative of in-cylinder combustion status to which the EGR rate is related, and conducted experiments to investigate the influence of internal combustion engine operating conditions on the in-cylinder flame velocity.

The following findings are obtained as a result of the analysis of data derived from the experiments. One of the findings is that there are two dominant factors affecting the in-cylinder flame velocity of the internal combustion engine. The first factor is the in-cylinder EGR rate. The second factor is an engine speed. It has been found that the other operating conditions, such as pneumatic filling efficiency, which governs the amount of heat generation, do not affect the flame velocity. Further, it has also been found that the in-cylinder flame velocity can be expressed by a two-variable linear function in which a flame velocity affected by the engine speed and a flame velocity affected by the in-cylinder EGR rate are respectively used as an independent variable.

The present invention has been made on the basis of the above-described novel findings.

An EGR rate determination method according to the present invention first calculates the combustion period by using the measured data about the in-cylinder pressure, which is detected by the in-cylinder pressure sensor, and then calculates the in-cylinder flame velocity from the combustion period. A main combustion period during which a combustion mass percentage increases from 10% to 90% can be used as the combustion period.

Next, the EGR rate determination method according to the present invention eliminates a portion affected by the engine speed from the flame velocity calculated from the combustion period in accordance with prepared data indicative of the influence of the engine speed on the flame velocity, and then determine a current EGR rate from the flame velocity from which a portion affected by the engine speed is eliminated.

The data indicative of the influence of the engine speed on the flame velocity can be prepared as a simple map that does not use the other operating conditions as parameters or prepared as a constant for a conversion equation that converts the engine speed to the flame velocity. The relationship between the in-cylinder EGR rate and the flame velocity from which the portion affected by the engine speed is eliminated is a relationship that remains unaffected by the other operating conditions. Therefore, the use of the EGR rate determination method according to the present invention eliminates the necessity of preparing an enormous amount of map data for determining the EGR rate and makes it possible to accurately determine the in-cylinder EGR rate in an unprecedentedly practical manner.

The present invention also provides a control device for an internal combustion engine that uses the above-described EGR rate determination method.

According to an aspect of the present invention, the control device is a control device for an internal combustion engine having an in-cylinder pressure sensor and an actuator capable of changing an EGR rate. The control device comprises: a computing element that calculates a combustion period by using in-cylinder pressure data measured by the in-cylinder pressure sensor; a computing element that calculates an in-cylinder flame velocity from the combustion period; a computing element that eliminates, in accordance with prepared data indicative of the influence of an engine speed on the flame velocity, a portion of the flame velocity calculated from the combustion period that is affected by the engine speed; and a controlling element that controls the EGR rate by operating the actuator while using the flame velocity from which the portion affected by the engine speed is eliminated as a current EGR rate index.

A preferred function of the controlling element that controls the EGR rate is to determine a current EGR rate from the flame velocity from which the portion affected by the engine speed is eliminated, and control the EGR rate so that the EGR rate coincides with a target EGR rate. Another preferred function is to control the EGR rate so that the flame velocity from which the portion affected by the engine speed is eliminated is not lower than a lower-limit value corresponding to a flammability limit.

According to another aspect of the present invention, the control device is a control device for an internal combustion engine having an in-cylinder pressure sensor. The control device comprises: a computing element that calculates a combustion period by using in-cylinder pressure data measured by the in-cylinder pressure sensor; a computing element that calculates an in-cylinder flame velocity from the combustion period; a computing element that eliminates, in accordance with prepared data indicative of the influence of an engine speed on the flame velocity, a portion of the flame velocity calculated from the combustion period that is affected by the engine speed; and a controlling element that determines a current EGR rate from the flame velocity from which the portion affected by the engine speed is eliminated, and controls an operation of the internal combustion engine in accordance with the current EGR rate.

BEST MODE FOR CARRYING OUT THE INVENTION

Experiments conducted during a process of originating the present invention and novel findings obtained as a result of the experiments will now be described with reference to the accompanying drawings.

Figure 3:
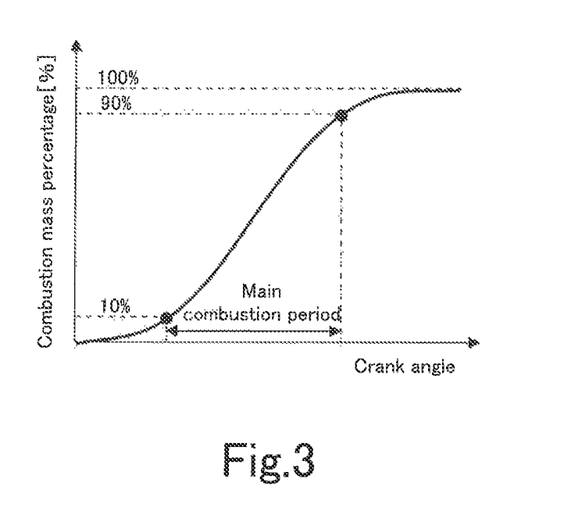
FIG. 3 is a diagram for explaining the method of calculating a flame velocity.

In the experiments, the in-cylinder pressure was measured with an in-cylinder pressure sensor while the operating conditions for an internal combustion engine (hereinafter referred to as the engine) were changed. The amounts of heat generation at various crank angles were calculated from data measured by the in-cylinder pressure sensor. The combustion mass percentage was determined through normalization that was performed while the amount of heat generation before the start of combustion and the amount of heat generation after the end of combustion were considered to be 0% and 100%, respectively. FIG. 3 is a graph illustrating how the combustion mass percentage varied with the crank angle. A period during which the combustion mass percentage increases from 10% to 90% is particularly called a main combustion period. The shorter the main combustion period, the higher the in-cylinder flame velocity. When the results of the experiments were analyzed, the flame velocity was calculated on the assumption that the front of a flame zone propagated over a certain distance (e.g., a bore radius) during the main combustion period.

Figure 4:
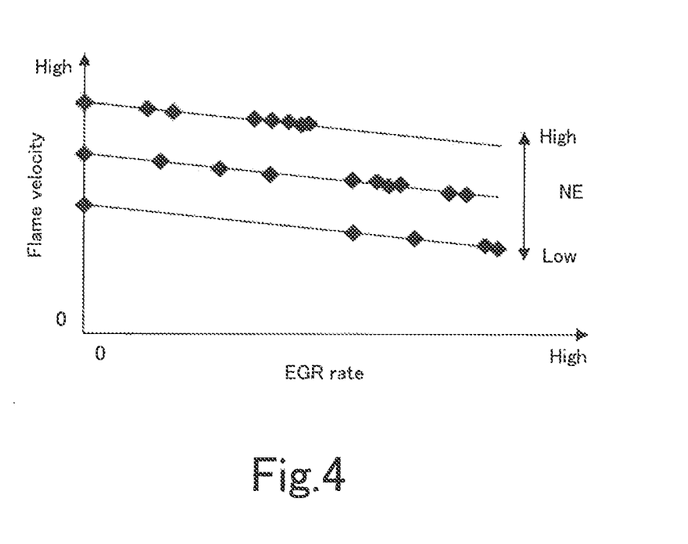
FIG. 4 is a diagram for illustrating the relation of the flame velocity, an EGR rate and an engine speed that was derived from experiments.

FIG. 4 is a graph illustrating data derived from the experiments. The vertical axis represents the flame velocity and the horizontal axis represents the EGR rate. During the experiments, the data was acquired while the engine speed (NE) was changed to multiple levels. The relationship between the flame velocity and the EGR rate was examined by using data obtained at the same engine speed. As a result, it was found that the data obtained at the same engine speed were aligned as indicated by three straight lines in the graph.

The experiments were conducted while changing not only the EGR rate and engine speed but also the other operating conditions such as the pneumatic filling efficiency. However, when the engine speed remains unchanged, a fixed relationship is established between the flame velocity and EGR rate irrespective of differences in the other operating conditions. It means that dominant factors affecting the in-cylinder flame velocity are the EGR rate and engine speed, and that the other operating conditions do not significantly affect the flame velocity. In other words, the data derived from the experiments reflects the fact that the in-cylinder flame velocity is determined by the EGR rate and engine speed, which are among the various operating conditions for the engine.

It was also found that the straight lines corresponding to different engine speeds were parallel to each other, and that the difference in the flame velocity, which was caused by the difference in the engine speed, was constant irrespective of the EGR rate. In other words, the influence of the EGR rate on the flame velocity was independent of the influence of the engine speed on the flame velocity.

Consequently, new knowledge indicating that the in-cylinder flame velocity can be divided into a flame velocity affected by the engine speed and a flame velocity affected by the in-cylinder EGR rate was acquired from the above findings. More specifically, new knowledge indicating that the in-cylinder flame velocity can be expressed by a two-variable linear function in which a flame velocity affected by the engine speed and a flame velocity affected by the in-cylinder EGR rate are respectively used as an independent variable was acquired.

For example, the above findings can be theoretically interpreted as described below. The reason why the EGR rate affects the flame velocity is that the EGR rate determines the composition of an in-cylinder gas, and that a change in the EGR rate changes the specific heat of the in-cylinder gas. Meanwhile, the reason why the engine speed affects the flame velocity is that the flow velocity of the in-cylinder gas varies with the engine speed. An increase in the engine speed increases the flow velocity of the gas passing through the opening of an intake valve, thereby increasing the velocity of the flow (e.g., tumble flow or swirl flow) of the gas generated in a cylinder. It is conceivable that an increase in the flow velocity of the gas increases the speed at which a flame propagates in a cylinder. The reason why the pneumatic filling efficiency does not affect the flame velocity is that although the pneumatic filling efficiency determines an initial in-cylinder pressure, the influence of the pressure on the flame velocity is insignificant.

It is also conceivable that the engine speed affects the flame velocity because an increase in the flow velocity of the in-cylinder gas causes a considerable turbulent flow, which increases the flame velocity. On a micro level, a turbulent combustion velocity can be defined as a laminar combustion velocity plus a turbulence velocity. If it is assumed that the velocity of the front of the flame zone is equal to the turbulent combustion velocity, it can be said that the severity of turbulence increases with an increase in the engine speed, thereby increasing the flame velocity. Based on the above assumption, it is conceivable that the EGR rate affects the laminar combustion velocity.

Figure 5:
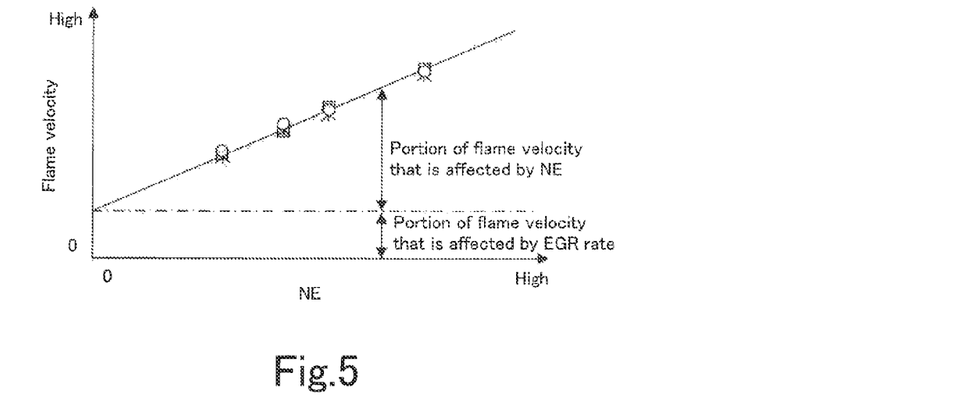
FIG. 5 is a diagram for illustrating the relation of the flame velocity and the engine speed that was derived from the experiments.

The next analysis was performed to determine how the engine speed affects the flame velocity. FIG. 5 is a graph illustrating data derived from the experiments that were conducted at the same EGR rate. The vertical axis represents the flame velocity and the horizontal axis represents the engine speed. The results of the experiments indicate that all the data were aligned as shown in the graph.

When attention was focused on the flame velocity prevailing when the engine speed is zero, that is, the flame velocity corresponding to the y-intercept of the graph that was obtained when an approximate line derived from the data was extended, it was found the engine speed does not affect the flame velocity at all at an engine speed of zero. Therefore, the flame velocity corresponding to the y-intercept of the graph is equivalent to a portion of the flame velocity that is affected by the EGR rate. Further, as the influence of the EGR rate on the flame velocity is independent of the influence of the engine speed on the flame velocity as mentioned earlier, the portion of the flame velocity that is affected by the EGR rate remains unaffected by the engine speed. Consequently, a portion of the flame velocity that is affected by the engine speed can be determined by subtracting the flame velocity corresponding to the y-intercept from the flame velocity prevailing at an individual engine speed.

As is obvious from the graph of FIG. 5, the portion of the flame velocity that is affected by the engine speed (the flame velocity affected only by the engine speed) is directly proportional to the engine speed. The data derived from the experiments verifies that the constant of such proportionality remains unchanged as far as the specifications for the engine remain unchanged and will not be altered by the EGR rate and other operating conditions. The proportionality constant confirmed by the experiments is acquired as data indicative of the influence of the engine speed on the flame velocity and used in a later-described engine control device.

Figure 6:
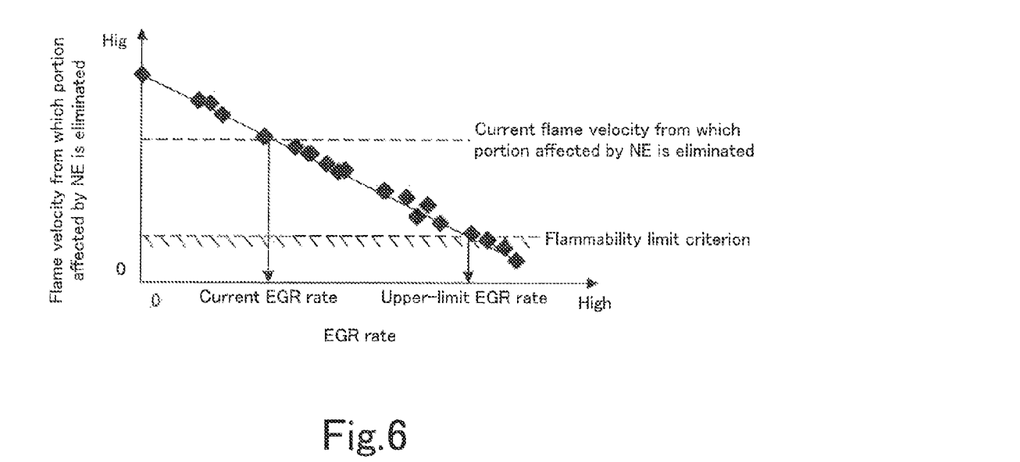
FIG. 6 is a diagram for illustrating the relation of the flame velocity from which the portion affected by the engine speed is eliminated and the EGR rate that was derived from the experiments.

The analyses made thus far revealed that the in-cylinder flame velocity is determined by adding a flame velocity affected by the engine speed to a flame velocity affected by the EGR rate. The analyses also revealed that a portion of the flame velocity that is affected by the engine speed (the flame velocity affected by the engine speed) is uniquely determined by the engine speed. In the next analysis, the data derived from the experiments was processed in accordance with the above-described novel knowledge to calculate a flame velocity from which a portion affected by the engine speed is eliminated, that is, a flame velocity affected only by the EGR rate. FIG. 6 is a graph illustrating the relationship between the EGR rate and the flame velocity from which the portion affected by the engine speed is eliminated.

As indicated by the graph of FIG. 6, there is a linear relationship between the EGR rate and the flame velocity from which the portion affected by the engine speed is eliminated (the flame velocity affected only by the EGR rate). The data derived from the experiments verifies that individual constants indicative of the linear relationship remain unchanged as far as the specifications for the engine remain unchanged and will not be altered by the engine speed and other operating conditions. The individual constants confirmed by the experiments are acquired as data for determining the EGR rate from the flame velocity from which the portion affected by the engine speed is eliminated, and used in the later-described engine control device.

Further, a tendency shown in the graph of FIG. 6 indicates that the flame velocity from which the portion affected by the engine speed is eliminated approaches to zero when the EGR rate increases. As discussed earlier, the flame velocity affected by the EGR rate is related to laminar combustion. Therefore, when this flame velocity approaches to zero, in-cylinder combustion becomes unstable to increase the likelihood of a misfire. Flammability limit criteria shown in the graph represent a lower-limit flame velocity that assures stable combustion. The EGR rate corresponding to the flammability limit criteria is an upper-limit EGR rate that assures stable combustion. This upper-limit EGR rate is also used in the later-described engine control device.

The present invention has been made on the basis of the novel knowledge derived from the results of the above experiments. An embodiment described below relates to an engine control device to which an EGR rate determination method according to the present invention is applied.

The engine to be controlled in accordance with an embodiment of the present invention is a four-cycle reciprocating engine that includes an EGR system and an in-cylinder pressure sensor. The EGR system is configured so that an EGR pipe connects an exhaust path to an intake path. An EGR valve attached to the EGR pipe is capable of adjusting the amount of EGR gas. It is preferred that the EGR pipe be provided with an EGR cooler. However, such an EGR cooler is not essential to the present invention. It is preferred that the in-cylinder pressure sensor be provided for each cylinder. In the present invention, however, the in-cylinder pressure sensor should be provided for at least one cylinder. The type of the engine is not specifically defined. The present invention is applicable to a gasoline engine such as a spark-ignition engine and a compression-ignition diesel engine. The present invention is also applicable to a naturally-aspirated engine and a supercharged engine. When the present invention is applied to the spark-ignition engine, its fuel injection system may be of either a port-injection type or a direct-injection type.

Figure 1:
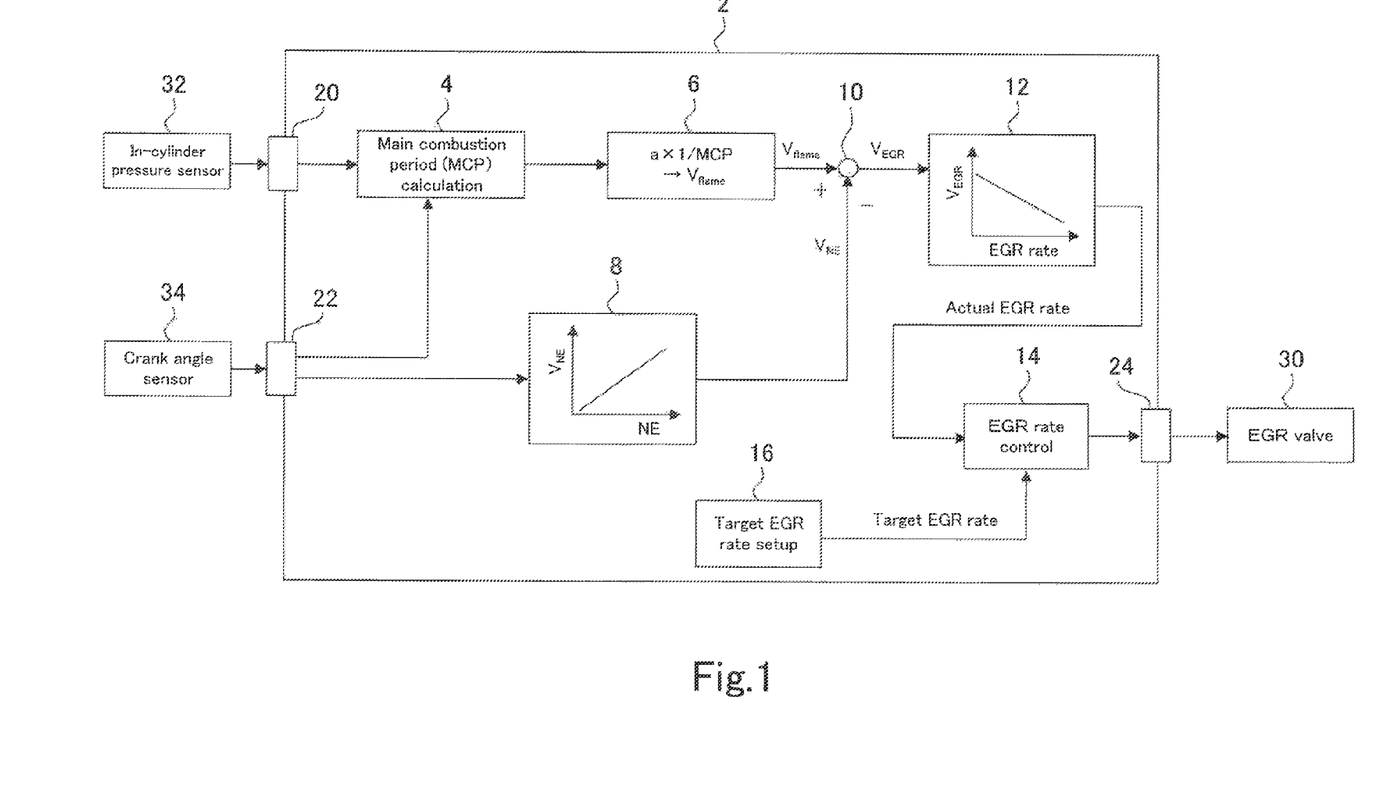
FIG. 1 is a block diagram illustrating a configuration of a control apparatus for an internal combustion engine according to an embodiment of the present invention.

FIG. 1 is a block diagram illustrating the configuration of an engine control device 2 according to an embodiment of the present invention. The configuration and functionality of the engine control device 2 will now be described with reference to FIG. 1.

The engine control device 2 controls an operation of the engine by operating actuators provided for the engine. The actuators operable by the engine control device 2 include an ignition device, a throttle, a fuel injection device, and an EGR system. In the present embodiment, however, it is assumed that the engine control device 2 operates an EGR valve 30 of the EGR system. The engine control device 2 controls the EGR rate in an engine cylinder by operating the EGR valve 30. The engine control device 2 includes an output port 24 that outputs a signal for the EGR valve 30.

Further, a large number of sensors installed inside and outside the engine input various signals to the engine control device 2. In the present embodiment, however, it is assumed that the engine control device 2 uses two signals: an in-cylinder pressure signal, which is input from an in-cylinder pressure sensor 32, and a crank angle signal, which is input from a crank angle sensor 34. The engine control device 2 includes an input port 20 to which the in-cylinder pressure sensor 32 inputs a signal, and an input port 22 to which the crank angle sensor 34 inputs a signal.

The engine control device 2 can be functionally divided into a main combustion period calculation section 4, a $V_{flame}$ calculation section 6, a $V_{NE}$ calculation section 8, a $V_{EGR}$ calculation section 10, an EGR rate calculation section 12, an EGR rate control section 14, and a target EGR rate setup section 16. These elements 4, 6, 8, 10, 12, 14 and 16 are the functional elements included in the engine control device 2, related to operating the EGR valve 30 for EGR rate control purposes, and specifically indicated in the figure. In other words, FIG. 1 does not mean that the engine control device 2 is formed only by these elements 4, 6, 8, 10, 12, 14 and 16. The elements 4, 6, 8, 10, 12, 14 and 16 may be formed by their own dedicated hardware or may share the same hardware and be virtually formed by software.

A crank angle signal is input from the crank angle sensor 34 to the main combustion period calculation section 4. The main combustion period calculation section 4 uses the crank angle signal to acquire an in-cylinder pressure signal from the in-cylinder pressure sensor 32 at predetermined crank angle intervals. The main combustion period calculation section 4 uses the acquired in-cylinder pressure signal as measured data about the in-cylinder pressure and calculates a heat generation amount by a publicly known calculation method. Further, the main combustion period calculation section 4 calculates a combustion mass percentage by a publicly known calculation method while assuming that the amount of heat generated before the start of combustion (e.g., at the time of ignition) is 0% and that the amount of heat generated at the end of combustion (e.g., when a heat generation amount change per crank angle is zero) is 100%. Eventually, the main combustion period calculation section 4 calculates a period during which the combustion mass percentage increases from 10% to 90% as a main combustion period MCP.

The $V_{flame}$ calculation section 6 calculates an in-cylinder flame velocity $V_{flame}$ from the main combustion period MCP. The in-cylinder flame velocity $V_{flame}$ can be determined by multiplying the reciprocal of the main combustion period MCP by a proportionality constant a as indicated by the following equation. The proportionality constant a is a fixed value that is determined by the specifications for the engine.

$$V_{flame}=a \times 1/\text{MCP}$$

A crank angle signal is input from the crank angle sensor 34 to the $V_{NE}$ calculation section 8. The $V_{NE}$ calculation section 8 calculates an engine speed NE from the crank angle signal, and calculates a flame velocity affected by the engine speed NE (a portion of the flame velocity that is affected by the engine speed NE) $V_{NE}$. As shown in the graph within a block of the $V_{NE}$ calculation section 8, there is a proportional relationship between the flame velocity $V_{NE}$ and the engine speed NE, which is expressed by the following equation.

$$V_{NE}=b \times NE$$

A value derived from the analyses of the earlier-described experiment results is used as a proportionality constant b in the above equation. The proportionality constant b is a fixed value that does not vary with the EGR rate and other operating conditions, and defined as data indicative of the influence of the engine speed on the flame velocity. The $V_{NE}$ calculation section 8 calculates the flame velocity $V_{NE}$ by multiplying the engine speed NE by the proportionality constant b.

In the present embodiment, an equation is used to calculate the flame velocity $V_{NE}$. However, an alternative is to use a map that associates the flame velocity $V_{NE}$ with the engine speed NE. As the map, a simple map that does not use the other operating conditions as parameters can be used.

The flame velocity $V_{flame}$ calculated by the $V_{flame}$ calculation section 6 and the flame velocity $V_{NE}$ calculated by the $V_{NE}$ calculation section 8 are both input into the $V_{EGR}$ calculation section 10. The $V_{EGR}$ calculation section 10 subtracts the flame velocity $V_{NE}$ from the flame velocity $V_{flame}$. This process is performed to eliminate a portion affected by the engine speed from the flame velocity $V_{flame}$ and leave only a portion of the flame velocity $V_{flame}$ that is affected by the EGR rate. The $V_{EGR}$ calculation section 10 calculates a flame velocity affected by the EGR rate (a portion of the flame velocity that is affected by the EGR rate) $V_{EGR}$ by subtracting the flame velocity $V_{NE}$ from the flame velocity $V_{flame}$.

The EGR rate calculation section 12 calculates the EGR rate from the flame velocity $V_{EGR}$. As shown in the graph within a block of the EGR rate calculation section 12, there is a linear relationship between the flame velocity $V_{EGR}$ and the EGR rate, which is expressed by the following equation.

$$V_{EGR}=c \times \text{EGR rate}+d$$

The constants c, d used in the above equations are determined in accordance with the analyses of the earlier-described experiment results and stored in the EGR rate calculation section 12 as data for determining the EGR rate from the flame velocity $V_{EGR}$. The EGR rate calculation section 12 uses these constants c, d to convert the flame velocity $V_{EGR}$ to an EGR rate and calculate an actual EGR rate that currently prevails.

In the present embodiment, an equation is used to calculate the EGR rate. However, an alternative is to use a map that associates the EGR rate with the flame velocity $V_{EGR}$. As the map, a simple map that does not use the other operating conditions as parameters can be used.

The currently prevailing actual EGR rate calculated by the EGR rate calculation section 12 is input into the EGR rate control section 14. A target EGR rate set by the target EGR rate setup section 16 is also input into the EGR rate control section 14. The EGR rate control section 14 determines an operation amount of the EGR valve 30 so that the currently prevailing actual EGR rate approaches the target EGR rate. More specifically, if the actual EGR rate is lower than the target EGR rate, the EGR rate control section 14 determines the operation amount so as to operate the EGR valve 30 in an opening direction. If, on the contrary, the actual EGR rate is higher than the target EGR rate, the EGR rate control section 14 determines the operation amount so as to operate the EGR valve 30 in a closing direction. The operation amount of the EGR valve 30, which is calculated by the EGR rate control section 14, is output to the EGR valve 30 through the output port 24.

The target EGR rate setup section 16 sets a target EGR rate that is not higher than the upper-limit EGR rate derived from the earlier-described experiment results. The reason is that if the actual EGR rate is higher than the upper-limit EGR rate, the flame velocity related to laminar combustion approaches to zero, thereby increasing the likelihood of a misfire.

As is obvious from the description of the elements 4, 6, 8, 10, 12, 14 and 16, although the engine control device 2 according to the present embodiment uses in-cylinder pressure data measured by an in-cylinder pressure sensor in a conventional manner, it does not require an enormous amount of map data in a process of determining the EGR rate from the measured data. Therefore, the present embodiment makes it possible to reduce an adaptation load at a design stage and save the memory space of the engine control device 2.

Figure 2:
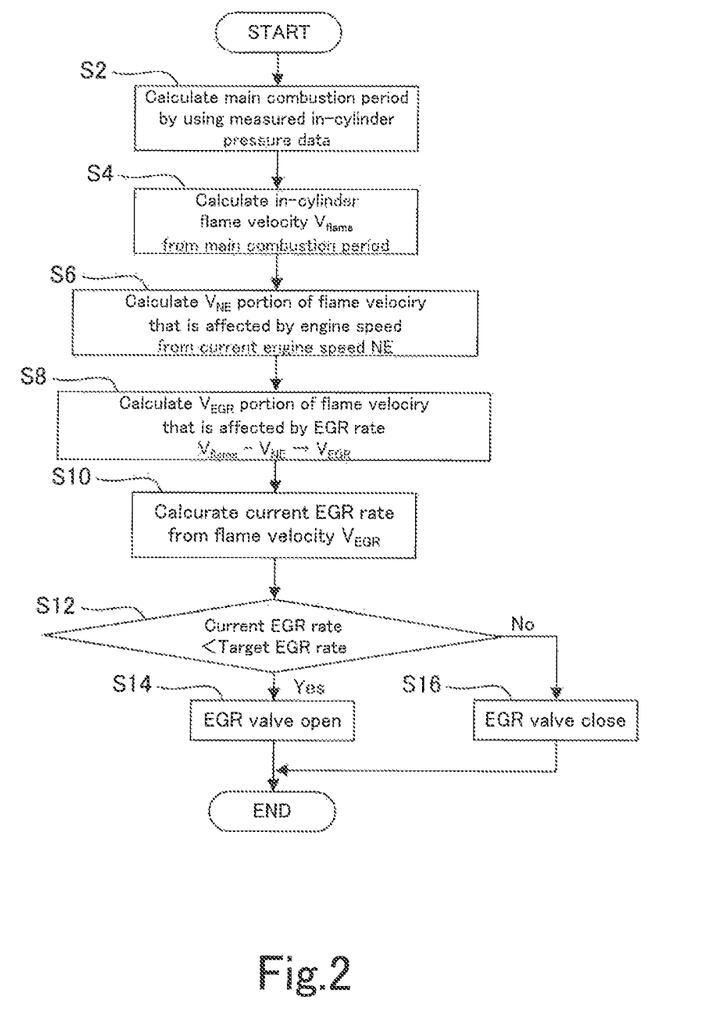
FIG. 2 is a flowchart showing a routine of EGR rate control which is performed in the embodiment of the present invention.

FIG. 2 is a flowchart illustrating how the engine control device 2 exercises EGR control. An EGR rate determination procedure indicated in this flowchart corresponds to the EGR rate determination method according to the present invention.

In step S2, which is the first step in the flowchart of FIG. 2, the in-cylinder pressure data measured by the in-cylinder pressure sensor 32 is used to calculate the main combustion period. In step S4, which is the next step, the in-cylinder flame velocity $V_{flame}$ is calculated from the main combustion period. In step S6, the portion $V_{NE}$ of the flame velocity that is affected by the engine speed NE is calculated from the current engine speed NE in accordance with prepared data indicative of the influence of the engine speed on the flame velocity.

In step S8, which is the next step, the portion $V_{EGR}$ of the flame velocity that is affected by the EGR rate is calculated by eliminating the portion $V_{NE}$ of the flame velocity that is affected by the engine speed NE from the in-cylinder flame velocity $V_{flame}$. In step S10, which is the next step, the current EGR rate is calculated from the flame velocity $V_{EGR}$ determined in step S8.

In step S12, the current EGR rate, which was calculated in step S10, is compared against the target EGR rate. If the comparison indicates that the current EGR rate is lower than the target EGR rate, the EGR valve 30 is operated in the opening direction in step S14. If, on the other hand, the comparison indicates that the current EGR rate is not lower than the target EGR rate, the EGR valve 30 is operated in the closing direction in step S16.

The engine control device 2 according to the present embodiment exercises EGR control in the manner described above. As the EGR rate determination method exercised in such a control process is based on the findings derived from the analyses of the earlier-described experiment results, it can accurately determine the current EGR rate. Further, the in-cylinder EGR rate can be controlled with high accuracy by comparing the accurately determined current EGR rate against the target EGR rate.

Moreover, the engine control device 2 according to the present embodiment stores in advance the upper-limit EGR rate that corresponds to a flammability limit, and controls the EGR rate with reference to the stored upper-limit EGR rate. This makes it possible to maximize the in-cylinder EGR rate within a range within which a misfire does not occur. In addition, the engine control device 2 according to the present embodiment is at an advantage in that it carries a limited computational load and excels in responsiveness as compared to a case where the EGR rate is controlled while detecting combustion changes and torque changes.

While the present invention has been described in connection with the foregoing embodiment, it should be understood that the present invention is not limited to the foregoing embodiment. The present invention extends to various modifications that nevertheless fall within the scope and spirit of the present invention. For example, it is assumed in the foregoing embodiment that the combustion period used to calculate the flame velocity is a period during which the combustion mass percentage increases from 10% to 90%. Alternatively, however, a longer period or a shorter period may be employed.

Further, the engine according to the foregoing embodiment includes an EGR system. However, the control device according to the present invention can also be applied to an engine having a variable valve timing mechanism that changes the valve timing of an intake valve or an exhaust valve. The variable valve timing mechanism can be operated to change so-called internal EGR for the purpose of controlling the in-cylinder EGR rate.

Furthermore, the engine control device 2 according to the foregoing embodiment exercises EGR rate control so that a determined current EGR rate coincides with the target EGR rate. Alternatively, however, engine operations may be controlled in accordance with the current EGR rate. For example, ignition timing, fuel injection amount, intake air amount, valve timing, and the like may be adjusted so as to maximize the fuel efficiency and emissions performance at the current EGR rate.

DESCRIPTION OF REFERENCE NUMERALS

2 Engine control device
4 Main combustion period calculation section
6 $V_{flame}$ calculation section
8 $V_{NE}$ calculation section
10 $V_{EGR}$ calculation section
12 EGR rate calculation section
14 EGR rate control section
16 Target EGR rate setup section
20, 22 Input port
24 Output port
30 EGR valve
32 In-cylinder pressure sensor
34 Crank angle sensor

The invention claimed is:

1. A control device for an internal combustion engine having an in-cylinder pressure sensor and an actuator capable of changing an EGR rate, the control device comprising:
    means for calculating a combustion period by using in-cylinder pressure data measured by the in-cylinder pressure sensor;
    means for calculating an in-cylinder flame velocity from the combustion period;
    means for eliminating, in accordance with prepared data indicative of a proportional relationship between an engine speed and the flame velocity, a portion of the flame velocity calculated from the combustion period that is affected by the engine speed; and means for controlling the EGR rate by operating the actuator while using the flame velocity from which the portion affected by the engine speed is eliminated as a current EGR rate index.

2. The control device according to claim 1, wherein the means for calculating the combustion period calculates a period during which a combustion mass percentage increases from 10% to 90% as the combustion period.

3. The control device according to claim 1, wherein the means for controlling the EGR rate determines a current EGR rate from the flame velocity from which the portion affected by the engine speed is eliminated, and controls the EGR rate so that the EGR rate coincides with a target EGR rate.

4. The control device according to claim 1, wherein the means for controlling the EGR rate controls the EGR rate so that the flame velocity from which the portion affected by the engine speed is eliminated is not lower than a lower-limit value corresponding to a flammability limit.

5. A control device for an internal combustion engine having an in-cylinder pressure sensor, the control device comprising:
    means for calculating a combustion period by using in-cylinder pressure data measured by the in-cylinder pressure sensor;
    means for calculating an in-cylinder flame velocity from the combustion period;
    means for eliminating, in accordance with prepared data indicative of a proportional relationship between an engine speed and the flame velocity, a portion of the flame velocity calculated from the combustion period that is affected by the engine speed; and means for determining a current EGR rate from the flame velocity from which the portion affected by the engine speed is eliminated, and controlling an operation of the internal combustion engine in accordance with the current EGR rate.

6. The control device according to claim 5, wherein the means for calculating the combustion period calculates a period during which a combustion mass percentage increases from 10% to 90% as the combustion period.

7. A control device for an internal combustion engine having an in-cylinder pressure sensor and an actuator capable of changing an EGR rate, the control device comprising:
    a controller that is programmed to:
    calculate a combustion period by using in-cylinder pressure data measured by the in-cylinder pressure sensor;
    calculate an in-cylinder flame velocity from the combustion period;
    eliminate, in accordance with prepared data indicative of a proportional relationship between an engine speed and the flame velocity, a portion of the flame velocity calculated from the combustion period that is affected by the engine speed;
    calculate a current EGR rate index from the flame velocity from which the portion affected by the engine speed is eliminated; and
    control the EGR rate by operating the actuator in accordance with the current EGR rate index.

8. A control device for an internal combustion engine having an in-cylinder pressure sensor, the control device comprising:
    a controller that is programmed to:
    calculate a combustion period by using in-cylinder pressure data measured by the in-cylinder pressure sensor;
    calculate an in-cylinder flame velocity from the combustion period;
    eliminate, in accordance with prepared data indicative of a proportional relationship between an engine speed and the flame velocity, a portion of the flame velocity calculated from the combustion period that is affected by the engine speed;
    determine a current EGR rate from the flame velocity from which the portion affected by the engine speed is eliminated; and
    control an operation of the internal combustion engine in accordance with the current EGR rate.

* * * * *